United States Patent

Hauck et al.

[11] Patent Number: 5,975,686
[45] Date of Patent: *Nov. 2, 1999

[54] REGULATOR FOR A FREE-INK INKJET PEN

[75] Inventors: Mark Hauck; James A. Harvey; Norman E. Pawlowski, Jr., all of Corvallis, Oreg.

[73] Assignee: Hewlett-Packard Company, Palo Alto, Calif.

[*] Notice: This patent is subject to a terminal disclaimer.

[21] Appl. No.: 08/873,612

[22] Filed: Jun. 12, 1997

Related U.S. Application Data

[63] Continuation-in-part of application No. 08/550,902, Oct. 31, 1995, Pat. No. 5,872,584, which is a continuation-in-part of application No. 08/518,847, Aug. 24, 1995, Pat. No. 5,736,992, which is a continuation-in-part of application No. 08/331,453, Oct. 31, 1994, Pat. No. 5,583,545, and application No. 08/701,367, Aug. 22, 1996.

[51] Int. Cl.[6] .................................................. B41J 2/175
[52] U.S. Cl. ............................................................ 347/85
[58] Field of Search .................................. 347/85, 86, 87

[56] References Cited

U.S. PATENT DOCUMENTS

| | | | |
|---|---|---|---|
| 4,475,116 | 10/1984 | Sickling et al. | 346/140 |
| 4,509,062 | 4/1985 | Low et al. | 346/140 |
| 4,739,347 | 4/1988 | Ishikawa et al. | 346/140 |
| 5,040,001 | 8/1991 | Dunn et al. | 346/140 |
| 5,409,134 | 4/1995 | Cowger et al. | 222/1 |
| 5,453,772 | 9/1995 | Aono et al. | 347/87 |
| 5,719,609 | 2/1998 | Hauck et al. | 347/85 |
| 5,872,584 | 2/1999 | Hauck et al. | 347/86 |

*Primary Examiner*—N. Le
*Assistant Examiner*—Anh T. N. Vo

[57] ABSTRACT

A free-ink inkjet pen is adapted to be fluidically coupled to a positive pressure, off-axis ink reservoir. The pen includes a pressure regulator mechanism in an ink accumulation chamber fluidically coupled to a print head mechanism maintained at a predetermined back pressure by the pressure regulator. A flexible bag is maintained at atmospheric pressure within the accumulator and acts as an actuator against a pressure regulator bias. In the preferred embodiment, the pressure regulator mechanism includes an actuation lever and a pressure regulation lever biased toward each other. The flexible bag is mounted between the levers where by expanding and contracting both levers are actuated appropriately. A variety of bag fabrication configurations, bag materials, and valve seat materials are disclosed.

14 Claims, 12 Drawing Sheets

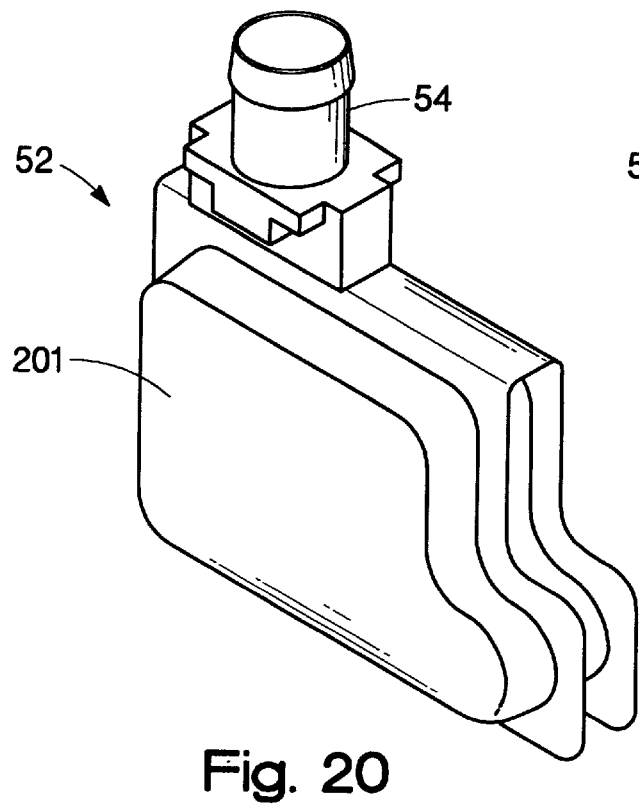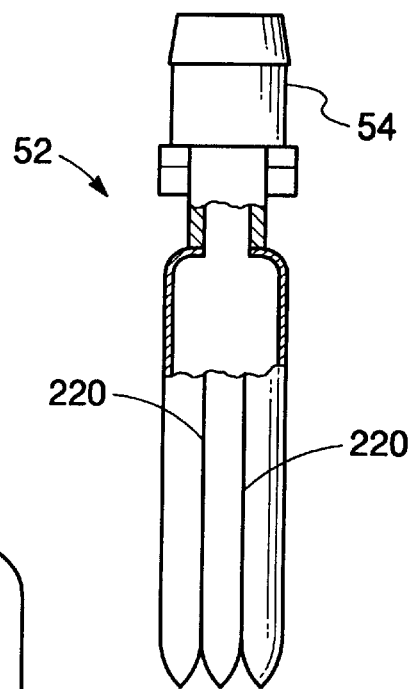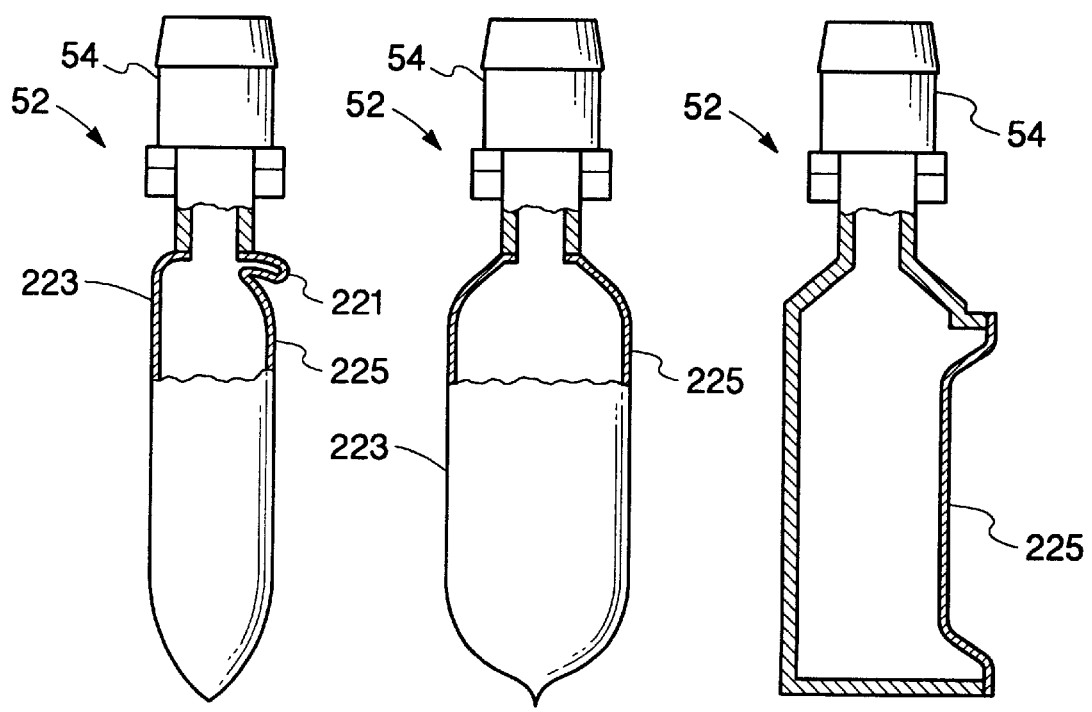
Fig. 20 Fig. 21
Fig. 22 Fig. 23 Fig. 24

REGULATOR FOR A FREE-INK INKJET PEN

CROSS-REFERENCE TO RELATED APPLICATIONS

This application is a continuation-in-part to U.S. patent application Ser. No. 08/550,902, filed on Oct. 31, 1995, now U.S. Pat. No. 5,872,584 by Hauck et al. for an APPARATUS FOR PROVIDING INK TO AN INK-JET PRINT HEAD AND FOR COMPENSATING FOR ENTRAPPED AIR, itself in turn a continuation-in-part application of U.S. patent application Ser. No. 08/518,847, filed on Aug. 24, 1995, now U.S. Pat. No. 5,736,992 entitled PRESSURE REGULATED FREE-INK INK-JET PEN by Pawlowski Jr., which in turn is a continuation-in-part of U.S. patent application Ser. No. 08/331,453, filed on Oct. 31, 1994, now U.S. Pat. No. 5,583,545 by Pawlowski Jr. et al., and a continuation-in-part to U.S. patent application Ser. No. 08/701,367, filed on Aug. 22, 1996 by Hauck et al. for a METHOD AND APPARATUS FOR REDUNDANT SEALING OF A PRINTHEAD PRESSURE REGULATOR.

BACKGROUND OF THE INVENTION

1. Field of the Invention

The present invention relates generally to the field of inkjet printing and, more particularly, to the delivery of ink to inkjet print heads and, more specifically to a regulator for a free-ink inkjet pen.

2. Description of Related Art

Inkjet technology is relatively well developed. The basics of this technology are described by W. J. Lloyd and H. T. Taub in "Inkjet Devices," Chapter 13 on Output Hardcopy Devices (Ed. R. C. Durbeck and S. Sherr, Academic Press, San Diego, 1988) and in various articles in the Hewlett-Packard Journal, Vol. 36, No. 5 (May 1985), Vol. 39, No. 4 (August 1988), Vol. 39, No. 5 (October 1988), Vol. 43, No. 4, (August 1992), Vol. 43, No. 6 (December 1992) and Vol. 45, No. 1 (February 1994).

The typical thermal inkjet print head has an array of precisely formed nozzles attached to a print head substrate that incorporates an array of firing chambers that received liquid ink (i.e., colorants dissolved or dispersed in a solvent) from an ink reservoir. In what is sometimes referred to as a disposable print cartridge, the ink reservoir is an integral element with the print head, sometimes referred to as on-axis. Alternatively, the pen can be a free-ink type print mechanism, where the ink is supplied to the print head mechanism from a separate, self-contained ink supply such as a biased ink bladder or bag—as shown in U.S. Pat. No. 5,359,353 (Hunt et al.) assigned to the common assignee of the present invention and incorporated herein by reference—sometimes referred to in the art as off-axis. An on-axis regulator mechanism is provided with the pen to control ink flow and print head pressure; one such regulator mechanism is disclosed by S. Dana Seccombe et al. in U.S. patent application Ser. No. 08/409,255, a continuation-in-part of Ser. No. 08/065,957 for an Apparatus for Providing Ink to a Printhead (sic).

Each firing chamber has a thin-film resistor, known as a firing resistor or heater resistor, located opposite the nozzle such that ink can collect between the heater resistor and the nozzle. When electric printing pulses heat the print head firing resistor, a small portion of the ink near it vaporizes and ejects a drop of ink from the print head via a nozzle orifice. The nozzles are arranged in a matrix array. Properly sequencing the operation of each firing resistor causes alphanumeric characters or graphics images to form on paper as the print head is scanned across adjacently positioned print media and a dot matrix of ink drops is printed to form a graphics image and alphanumeric characters.

In an effort to reduce the cost and size of inkjet printers and to reduce the cost per printed page, engineers have developed inkjet printers having small, moving print heads that are connected to large stationary ink reservoirs by flexible ink tubes. This development is called "off-axis" printing. In such printers the mass of the print head is sharply reduced so that the cost of the print head drive system and the overall size of the printer can be minimized. In addition, separating the ink reservoir from the print head has allowed the ink to be replaced as it is consumed without requiring frequent replacement of the costly print heads.

With the development of off-axis printing has come the need for numerous flow restrictions to the ink between the ink reservoir and the print head. These restrictions include additional orifices, or ink ports, narrow conduits, and shut-off valves. To overcome these flow restrictions and also to provide ink drops suitably over a range of printing speeds, ink is now transported to the print head at an elevated pressure and a pressure reducer has been added to deliver the ink to the print head at an optimum back pressure (an internal pressure gauged at the print head that is substantially less than the pressure at the ink reservoir and through the conduits).

One complication in the evolution of off-axis printing is the increasing need to maintain the back pressure of the ink at the print head to within as small a range as possible. Changes in back pressure greatly affect print density and print quality, and major changes in back pressure can cause either the ink to drool out of the nozzles or to deprime the print cartridge.

There are several causes for such changes in back pressure. One cause occurs when air is entrapped within the print cartridge and the print cartridge is subjected to changes in environmental parameters such as altitude, acceleration, and temperature ("air" as used herein includes both ambient air and gases that are out gassed from the ink chemical itself. If the air entrapped in a print pen acts according to the Ideal Gas Law, $PV=nRT$, then any changes in any of these parameters will cause corresponding changes in print head back pressure. Another cause is the delay between the time the print head starts to eject ink during on-demand printing and the time the pressure regulator actuates to restore the back pressure.

These complications as well as the use of pressurized ink delivery have all resulted in a need for more accurate back pressure regulation at inkjet print heads and for more precise compensation techniques.

SUMMARY OF THE INVENTION

Briefly and in general terms, an apparatus according to the present invention includes a pressure regulator in fluid communication with an ink accumulator, sometimes referred to as a plenum, of a free-ink inkjet pen and a flexible air bag within the accumulator for actuating the pressure regulator based on a difference between relative ambient pressure and a predetermined regulator back pressure. The bag is formed of a variety of flexible materials and is provided in a variety of configurations.

In its basic aspects, the present invention provides a pressure regulator device for an inkjet pen. The regulator device includes: an inlet valve mechanism for controlling flow of ink into the pen, the inlet valve mechanism is adapted to be coupled releasably to an ink supply; and coupled to the inlet valve mechanism, a first lever mechanism for maintaining a predetermined back pressure within the inkjet pen, a second lever mechanism for opening and closing the valve mechanism, a bias mechanism for biasing the first lever mechanism such that a predetermined back pressure is established within the inkjet pen and such that the first lever mechanism and second lever mechanism are mounted with a bias toward each other, and a flexible inflation-deflation mechanism, vented to ambient atmospheric pressure, for balancing ambient atmospheric pressure against the bias mechanism. The inflation-deflation mechanism is mounted between the first lever mechanism and the second lever mechanism such that predetermined areas of the inflation-deflation mechanism contact each the lever mechanism respectively and have shapes and dimensions such that the contact areas are maximized.

Another basic aspect of the present invention is embodied in an inkjet pen device for an inkjet pen adapted to be coupled to an off-axis supply of ink. The pen device includes: an ink accumulation chamber; a mechanism for fluidically coupling the supply of ink to the chamber such that ink is transferred from the supply of ink to the chamber at a first predetermined pressure greater than or equal to ambient atmospheric pressure; a print head fluidically coupled to the chamber; mounted within the chamber, a first mechanism for regulating ink flow into the chamber and for maintaining a predetermined gauge pressure at the print head such that the gauge pressure is less than the first predetermined pressure, the first mechanism having a positive force bias mechanism; and coupled to the first mechanism via the positive force bias mechanism, a second mechanism for compensating for trapped gases within the chamber and for maintaining a predetermined gauge pressure at the print head such that the gauge pressure is less than the first predetermined pressure, the second mechanism including an inflationdeflation mechanism having a vent to ambient atmospheric pressure and being mounted within the chamber such that the inflation-deflation mechanism provides a counter-bias force against the positive force bias mechanism.

Still another basic aspect of the present invention is embodied in an inkjet printing apparatus. The apparatus includes: a remote ink reservoir containing ink under a pressure of P1; an inkjet print head; an ink accumulation chamber in fluid communication with the print head; a conduit for ink selectively connecting the remote reservoir and the accumulation chamber; a valving mechanism in fluid communication with the ink accumulation chamber and connectable to the conduit; a predetermined area within the print cartridge to collect air; an expandable/contractible bag within the ink accumulation chamber maintained at an internal reference pressure, the bag having an exterior region in fluid communication with the predetermined air collection area and compensating for air within the print cartridge; an actuating mechanism for supplying ink to the print head at a substantially constant back pressure of P2, where P1 is substantially greater than P2, the actuating mechanism having a pivot axis and a predetermined pivot range; and the bag directly bearing against the actuating mechanism wherein contact areas of the actuating mechanism and the bag have shapes and dimensions to maximize contact area throughout the pivot range of the actuating mechanism.

It is an advantage of the present invention that it provides a pressure regulator having an air bag fabricated of a material having a low secant modulus, improving back pressure variation range.

It is an advantage of the present invention that it provides an air bag having excellent barrier properties with respect to both gases and liquids, e.g., air and ink.

It is an advantage of the present invention that it an air bag is provided which can withstand a thirty to fifty percent deformation without change in physical or barrier properties.

It is still another advantage of the present invention that it provides an air bag capable of withstanding repeated expansion and contractions without material properties being affected.

It is still another advantage of the present invention that it provides an air bag having a high value for folding endurance.

It is a further advantage of the present invention that it provides an air bag of a material that is adaptable to heat staking attachment techniques.

It is a further advantage of the present invention that it is amenable to high speed production line assembly techniques for manufacture.

It is an advantage of the present invention that it provides an air bag configuration consistent contact with the regulator mechanisms to provide improved repeatability of the preset back pressure from pen-to-pen during manufacture.

It is an advantage of the present invention that it provides an air bag configuration wherein the moment arm of air bag contact area with the regulator mechanisms is increased.

It is yet another advantage of the present invention that it minimizes the energy requirement for the desired range of expansion and contraction movement.

Other aspects and advantages of the invention will become apparent from the following detailed description, taken in conjunction with the accompanying drawings, illustrating by way of example the principles of the invention. The drawings referred to in this description should be understood as not being drawn to scale except if specifically noted.

BRIEF DESCRIPTION OF THE DRAWINGS

FIG. 20 is a perspective drawing of a preferred embodiment of an air bag with fitment in accordance with the present invention.

FIG. 21 is a elevation drawing of an alternative embodiment in accordance with the present invention as shown in FIG. 20.

FIG. 22 is a elevation drawing of an alternative embodiment in accordance with the present invention as shown in FIG. 20.

FIG. 23 is a elevation drawing of an alternative embodiment in accordance with the present invention as shown in FIG. 20.

FIG. 24 is a elevation drawing of an alternative embodiment in accordance with the present invention as shown in FIG. 20.

Figure 1:
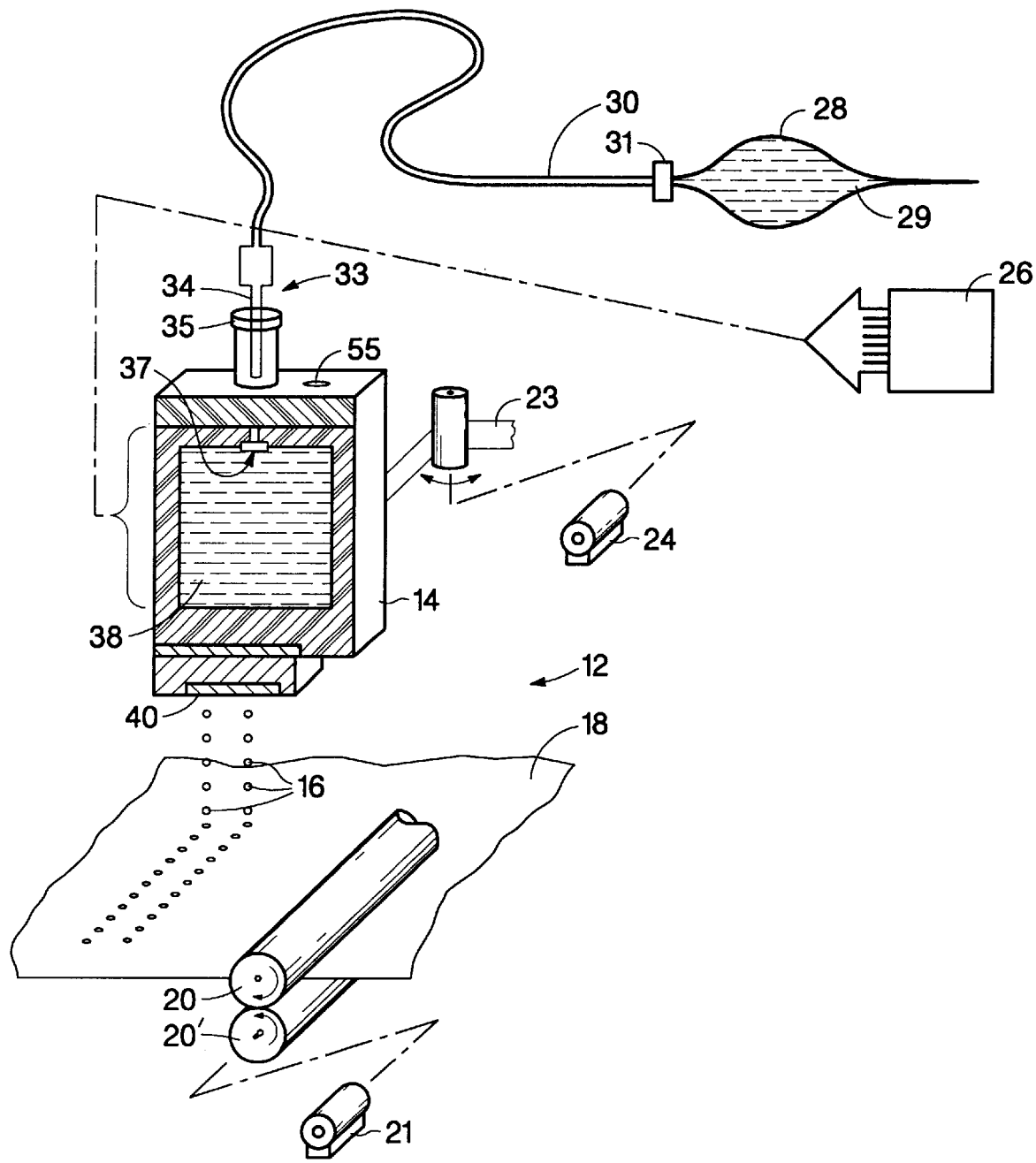
FIG. 1 is a diagrammatic, perspective view in section of an inkjet printer according to the present invention.

Other objects, features and advantages of the present invention will become apparent upon consideration of the following detailed description and the accompanying drawings, in which like reference designations represent like features throughout the FIGURES.

DESCRIPTION OF THE PREFERRED EMBODIMENTS

Reference is made now in detail to a specific embodiment of the present invention, which illustrates the best mode presently contemplated by the inventors for practicing the invention. Alternative embodiments are also briefly described as applicable.

As shown in the drawings for the purpose of illustration, the invention is embodied in free-ink inkjet pen having a regulator.

Referring to FIG. 1, reference numeral 12 generally indicates a printer including a pen 14 that ejects drops 16 of ink on command. The drops form images on a printing medium 18, such as paper. The printing medium is moved laterally with respect to the pen 14 by a motor 21 coupled to two print rollers 20, 20' and that engage the printing medium. The pen 14 is moved back and forth across the printing medium by a drive belt 23 and a motor 24. The pen 14 contains a plurality of firing resistors, not shown, that are energized on command by an electrical circuit 26. The circuit sequentially energizes the firing resistors in a manner so that as the pen 14 moves laterally across the paper and the paper moved by the rollers 20, 20', the drops 16 form images on the printing medium 18. Dot matrix manipulation is used to form alphanumeric characters and graphics or photographic images from the ink drops.

In FIG. 1 the ink reservoir 28 is a flaccid bag that contains ink 29. The ink supply 28 may be replenishable or refillable. The bag is pressured to a level between −5" of water to +60" or more of water for delivery to the pen 14. The ink reservoir 28 is connected to a conduit of flexible tubing 30 by a fluid upstream interconnect 31. The fluid upstream interconnect 31 contains a valve, not shown, that shuts whenever the reservoir 28 is separated from the tubing 30 so that ink 29 does not leak from either the reservoir 28 or the tubing 30 and air is not ingested into the tubing 30. The tubing 30 terminates in an on-axis fluid downstream interconnect 33 including a hollow, blunt needle 34 and septum 35. The needle 34 pierces the septum 35 and establishes fluid communication between the flexible tubing 30 and the pen 14. Within the pen 14, the ink is delivered to a back pressure regulator 37 that controls the supply of ink into an on-axis ink accumulator 38. The pressure regulator 37 maintains the back pressure in the accumulator, as gauged at a print head 40 so that ink 29 is supplied to the print head 40 at a substantially constant pressure. This pressure can range from 0 to −50" of water depending on the design of the print head 40, although the preferable range is from −2" to −7" of water. Ink is ejected from the print head 40 through a plurality of nozzles, not shown, on to the printing medium 18.

Figure 2:
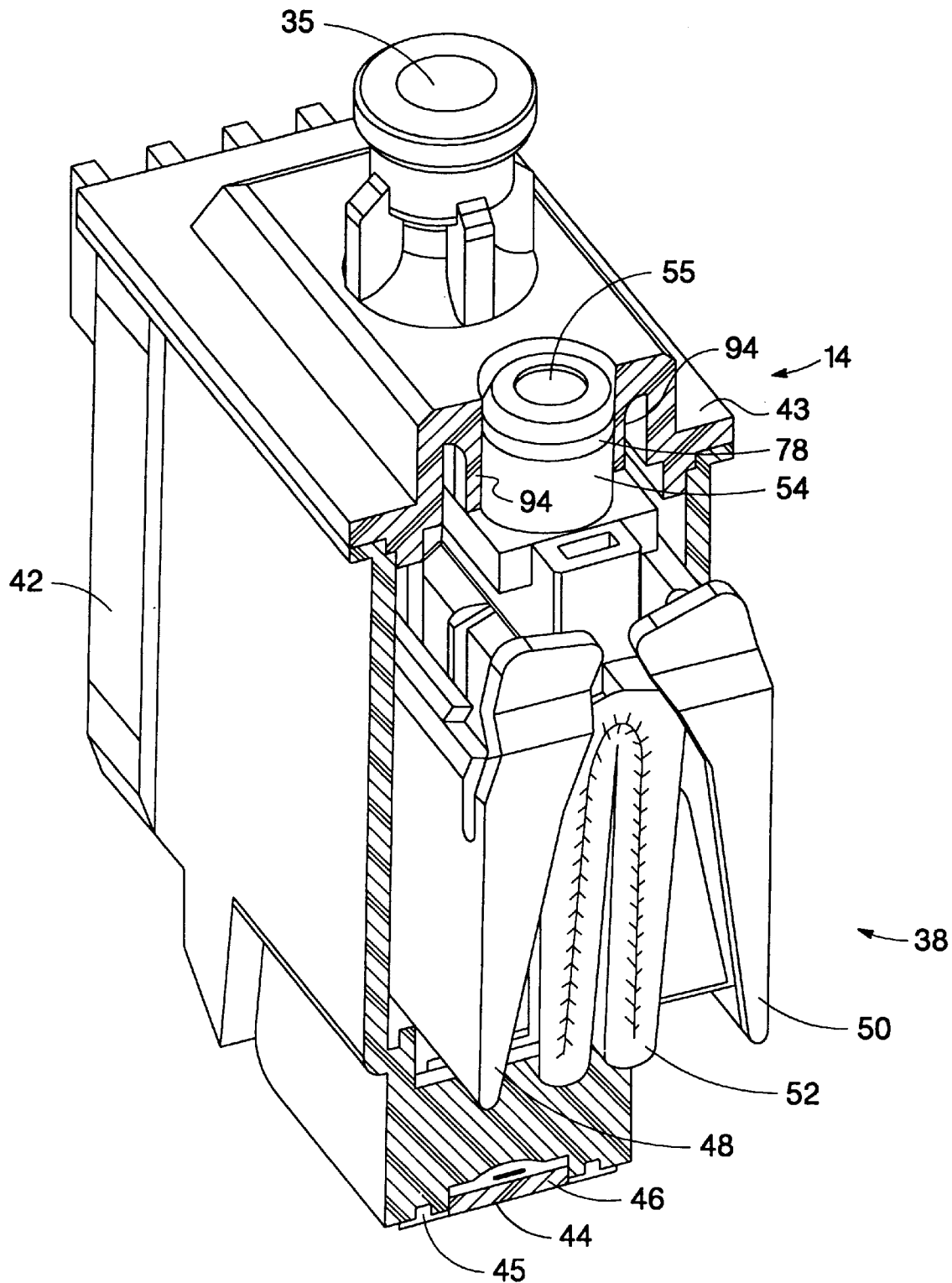
FIG. 2 is a perspective view in section of a portion of an printing mechanism adapted for use with the printer of FIG. 1.

Referring to FIG. 2, reference numeral 14 generally indicates the pen 14 that includes a pen body, or housing, 42, and a crown 43 that forms a cap to the housing 42. Located at a remote end of the pen body 42 from the crown 43 region is a preferred embodiment, tape-automated bonding ("TAB") type, head assembly, or "THA," 44. The THA 44 includes a flex circuit 45 and a silicon die 46 that forms the print head 40 (FIG. 1). The THA 44 is of conventional construction as would be known to a person skilled in the art. Also located within the accumulator 38 of the pen body 42 is a pressure regulator lever 48, an accumulator lever 50, and a flexible, gas, or air, bag 52. In FIG. 2, the bag 52 is illustrated in a fully inflated condition.

Figure 3:
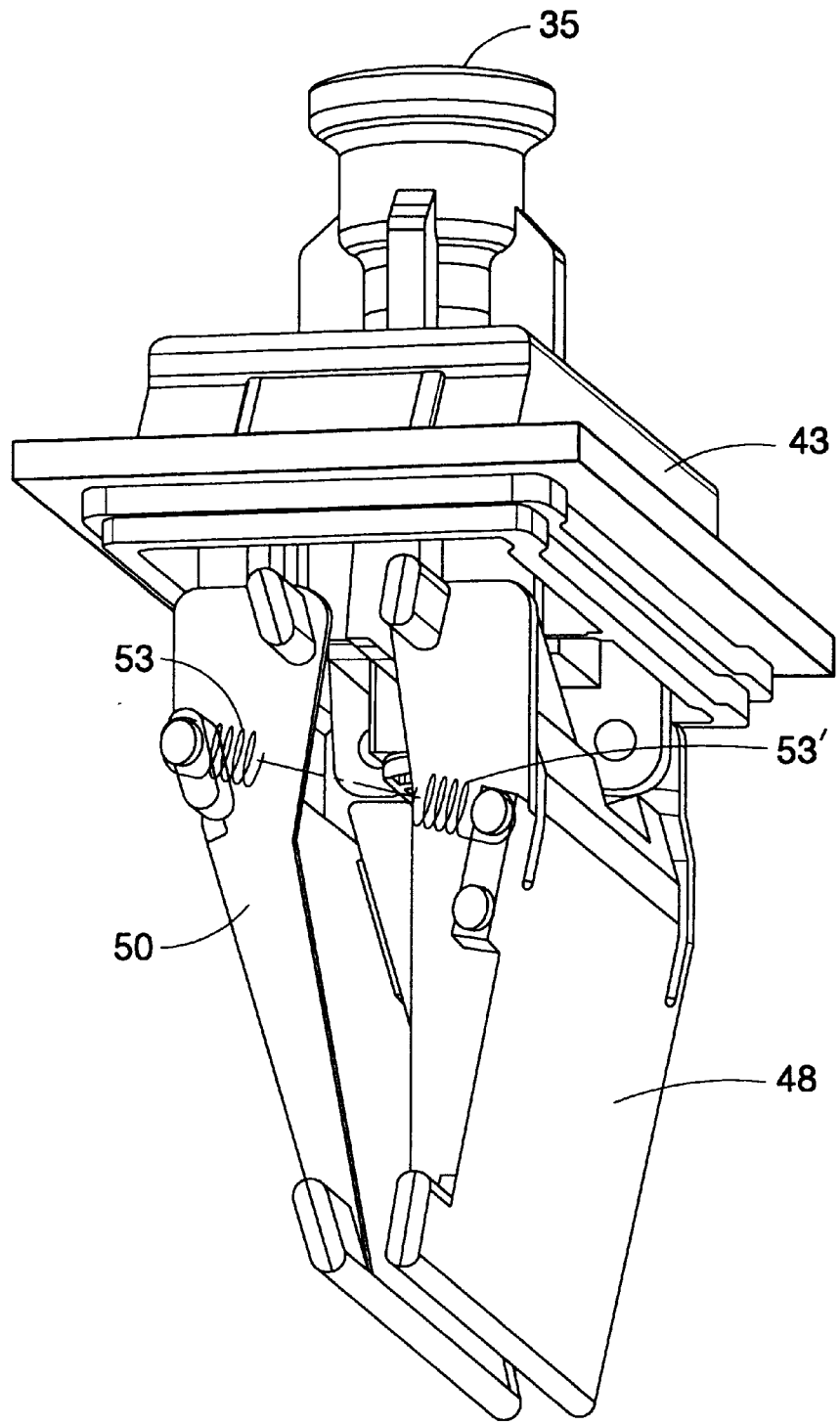
FIG. 3 is a perspective view of a pressure regulator sub-assembly of the printing mechanism of FIG. 2; for clarity a flexible air bag in accordance with the present invention is not shown.

Turning also to FIG. 3, for clarity of illustration the bag 52 is not shown. The pressure regulator lever 48 and the accumulator lever 50 are urged together by a biasing member having a predetermined spring constant, such as a spring, 53, 53'. In opposition to the spring 53, 53', the bag 52 spreads the two levers 48, 50 apart as it inflates outwardly. The bag 52 is sealingly mounted, such as by heat staking to a fitment 54 that mounted, such as by a press-fit, into the crown 43. The fitment 54 contains a vent 55, such as a vent screw (not shown) to ambient pressure in the shape of a helical, labyrinth path. The vent connects and is in fluid communication with the inside of the bag 52 so that the bag 52 is maintained at a reference pressure, in this embodiment, ambient atmospheric pressure. The helical path limits the diffusion of accumulated water and ink vapors out of the bag 52.

Figure 4:
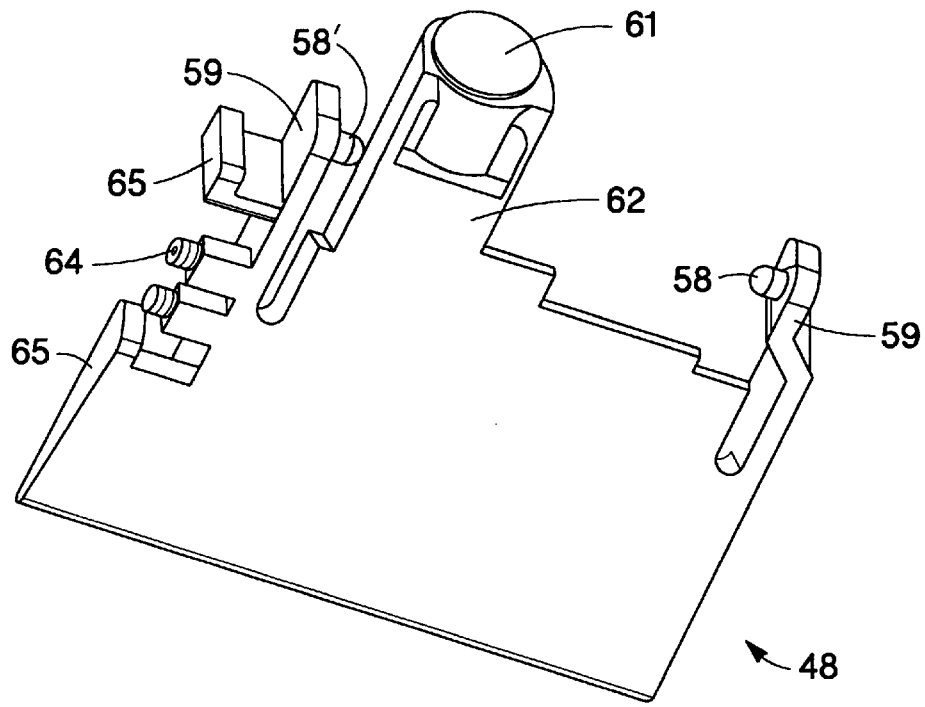
FIG. 4 is a perspective view of a pressure regulator lever of the pressure regulator sub-assembly of FIG. 3.
Figure 5:
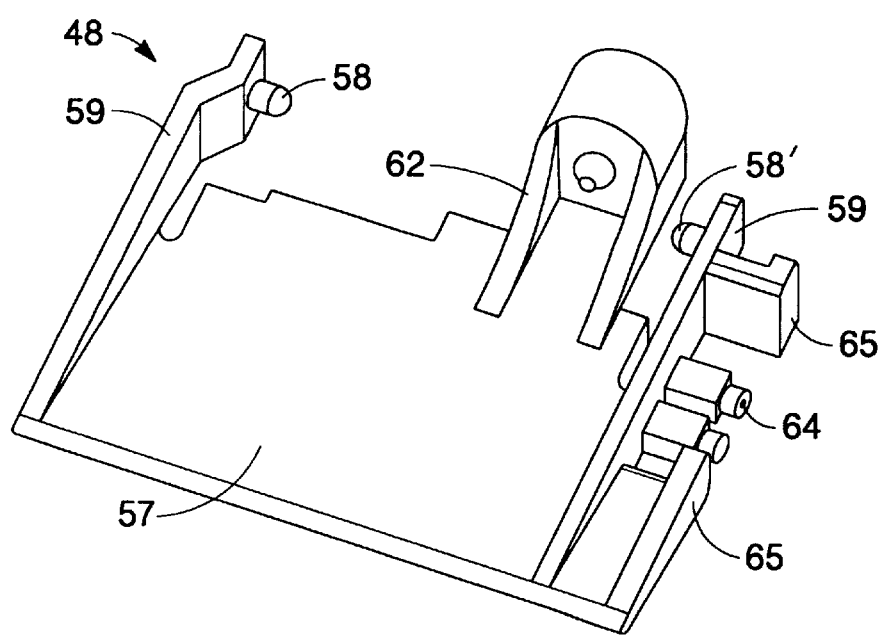
FIG. 5 is a perspective view of the opposite side of the pressure regulator lever of FIG. 4.
Figure 16:
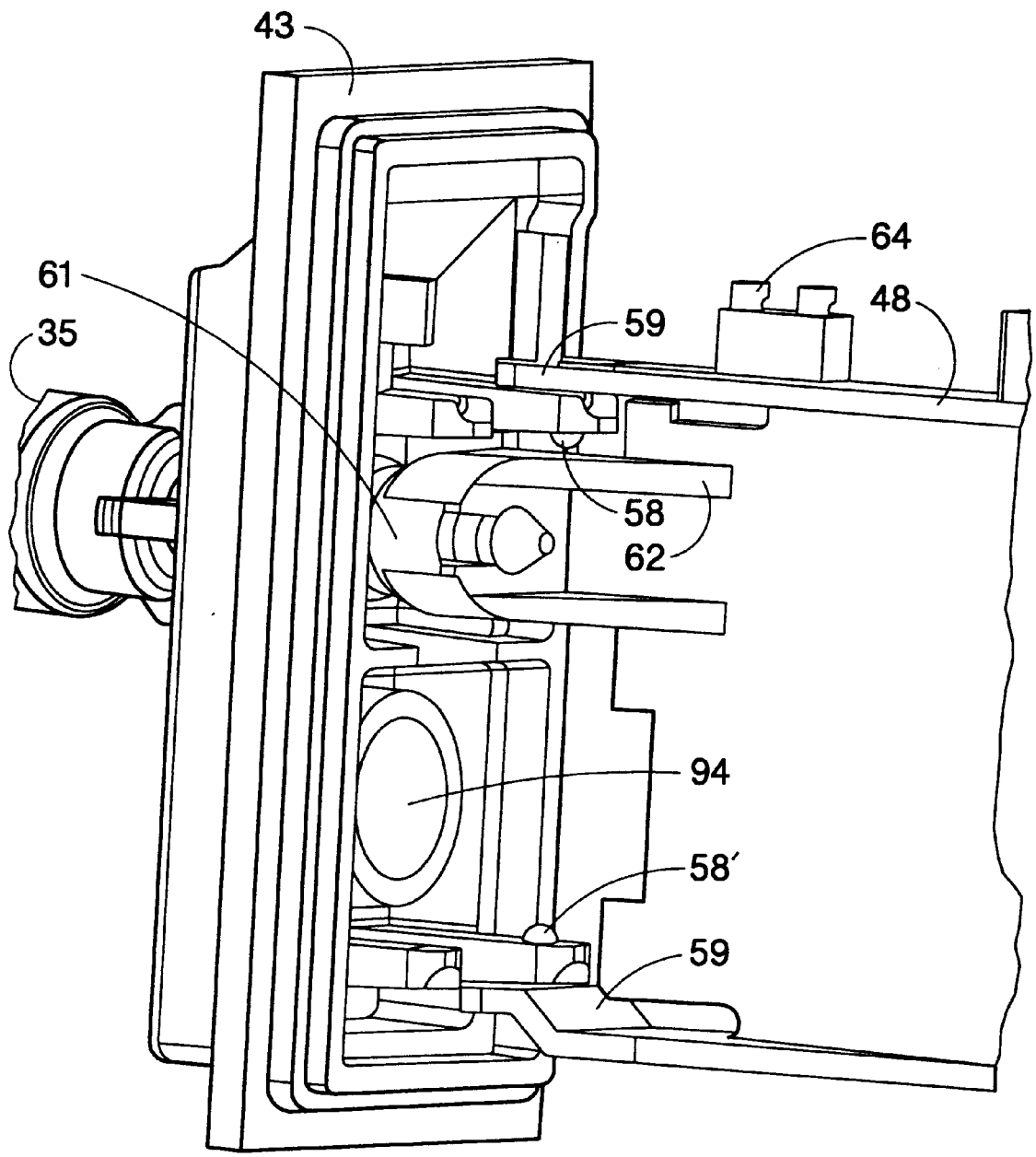
FIG. 16 is a perspective view, partially cut away, of the crown and the pressure regulator lever of FIG. 3; for clarity the accumulator lever is not illustrated.
Figure 19:
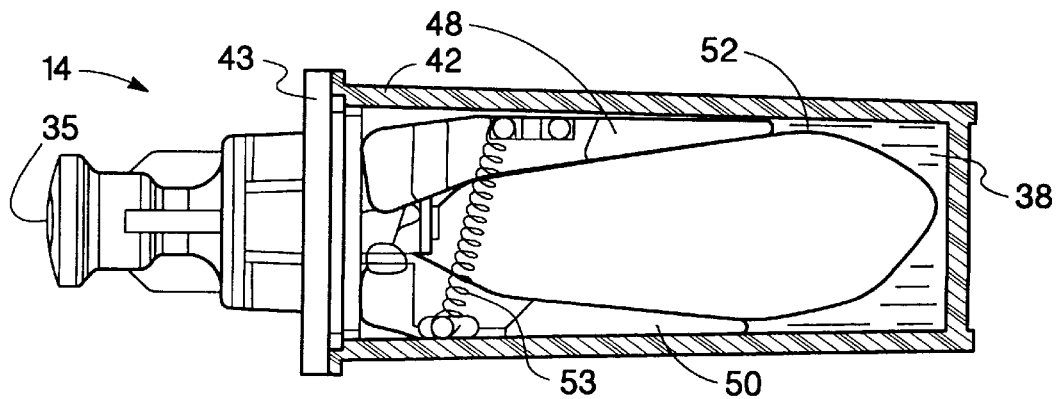

The pressure regulator lever 48 is illustrated in detail in FIGS. 4 and 5. Reference numeral 57 generally indicates the location of the area where the bag 52 directly bears against the lever. The pressure regulator lever 48 rotates about two opposed axles 58, 58' that form the axis of rotation of the lever 48. The pivot-like rotation of the lever 48 about this axis is stopped when the lever engages the pen body 42 inside housing wall as illustrated in FIG. 19 or when the back pressure within the pen 14 will not support further roataiton agains the spring 53, 53'. The axles 58, 58' are located at the ends of cantilevers 59 formed by deep slots so that the cantilevers 59 and the axles 58, 58' can be spread apart during manufacture and snapped onto place on the crown 43 as illustrated in FIG. 16. Perpendicular to the plane of the pressure regulator lever 48 is a valve seat 61 and a valve seat holder 62. The valve seat 61, fabricated from a resilient material, is pressed into place on the holder 62. The material for the seat is selected from the group of materials including:

(1) fluorosilicone elastomers,
(2) silicon rubbers,
(3) blends of fluorosilicone and silicon,
(4) fluoroelastomers, e.g., DuPont$^{tm}$ Viton$^{tm}$, consisting of either a combination of copolymers based on viylidene fluoride and heafluoropropylene or a combination of tripolymers based on vinylidene fluoride, hexafluoropropylene, and tetraflurorethylene, and (5) EDPM (ethylene propylene dimer- or diene-monamers). EDPM provides a high performance preference.

In response to expansion and contraction of the bag 52, the regulator pressure regulator lever 48 rotates about the axles 58, 58' and causes the valve seat 61 to open and shut against a mating surface on the crown 43 as described below. This rotational motion controls the flow of ink 29 into the ink accumulator 38, FIG. 1. There is an optimization between maximizing the force on the valve seat 61 and obtaining sufficient motion of the lever. In a commercial embodiment actually constructed, the lever ratio between the distance between the centroid of the lever, generally at point 57, and the axles 58, 58' and the distance between the center of the valve seat 61 and the axles 58, 58' is between two-to-one and five-to-one with four-to-one being preferred. The pressure regulator lever 48 also includes a spring boss 64 that engages one end of the spring 53, 53' (FIG. 3). The spring boss 64 is protected during manufacture by two shoulders 65 which are not illustrated in FIG. 3.

Figure 6:
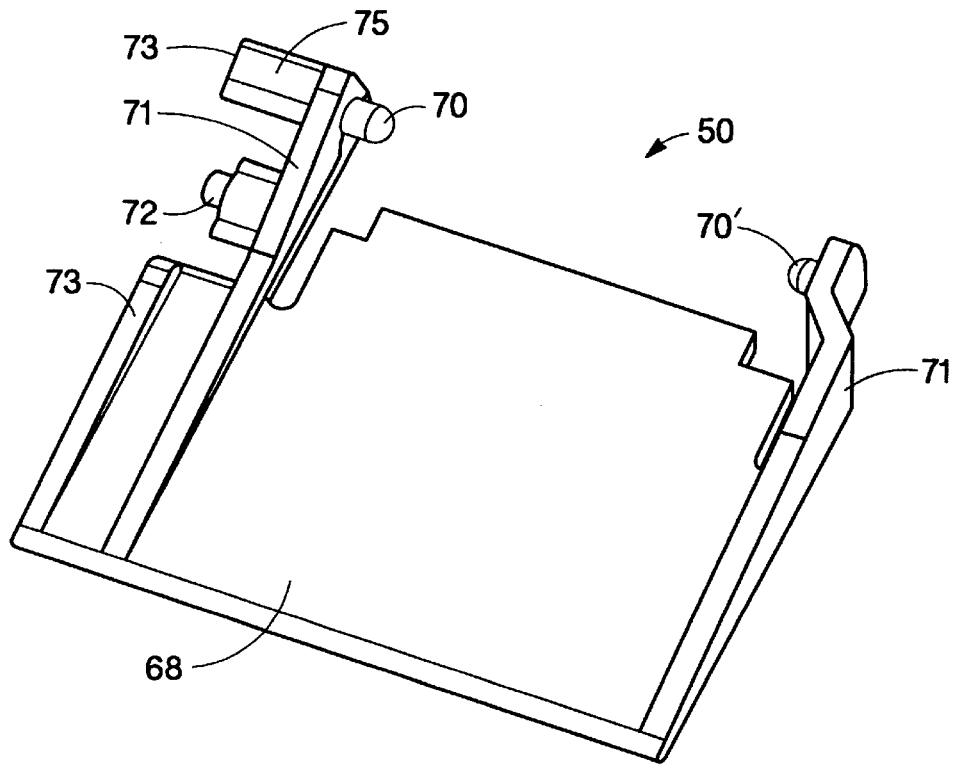
FIG. 6 is a perspective view of an accumulator lever of the pressure regulator sub-assembly of FIG. 3.

The accumulator lever 50 is illustrated in FIG. 6 and includes an actuation area 68 where the bag 52 directly bears against the lever. The accumulator lever 50 rotates about two opposed axles 70, 70' that form an axis of rotation of the accumulator accumulator lever 50. The axles 70, 70' are remotely located on cantilevers 71 so that the axles and the cantilevers can be spread apart during manufacture and snapped into place on the crown 43 as described below. The accumulator lever 50 also includes a spring boss 72 on the accumulator lever 50 and is protected during manufacture by the shoulders 73; these shoulders are not illustrated in FIG. 3.

The accumulator lever 50 and the bag 52 operate together to accommodate changes in volume due to any air that may be entrapped in the pen 14, FIG. 1 as well as due to any other pressure changes. The accumulator lever 50 acts to modulate any fluctuations in the back pressure. The accumulator lever 50 squeezes the bag 52, the inside of which is at ambient pressure, forces air out of the bag 52 and allows air trapped within the pen 14 ink chamber 38 to expand.

Although most of the ink accumulation is provided by the movement of the accumulator lever 50 and the bag 52, there is additional accumulation provided by the pressure regulator lever 48 in cooperation with the resilient valve seat 61, FIG. 4. The valve seat 61 acts also as a spring and allows some movement of the regulator lever 48 while the valve is shut. In other words, as the back pressure within the accumulator 38 decreases, the bag 52 exerts less force on the levers 48, 50 and the spring 53, 53' urges the levers 48, 50 together. The motion of the regulator lever 48 compresses the valve seat 61 and the regulator lever 48 shuts a little further. This movement of the regulator pressure regulator lever 48 with the bag 52 results in some additional air accommodation.

It should be appreciated that the boss 72 on the accumulator lever 50 is closer to the axis of rotation of the accumulator lever 50 than the boss 64, FIGS. 4 and 5, on the pressure regulator lever 48 is to its axis of rotation. This difference in distance causes the accumulator lever 50 to actuate before the pressure regulator lever 48 moves when the back pressure is increasing.

Figure 15:
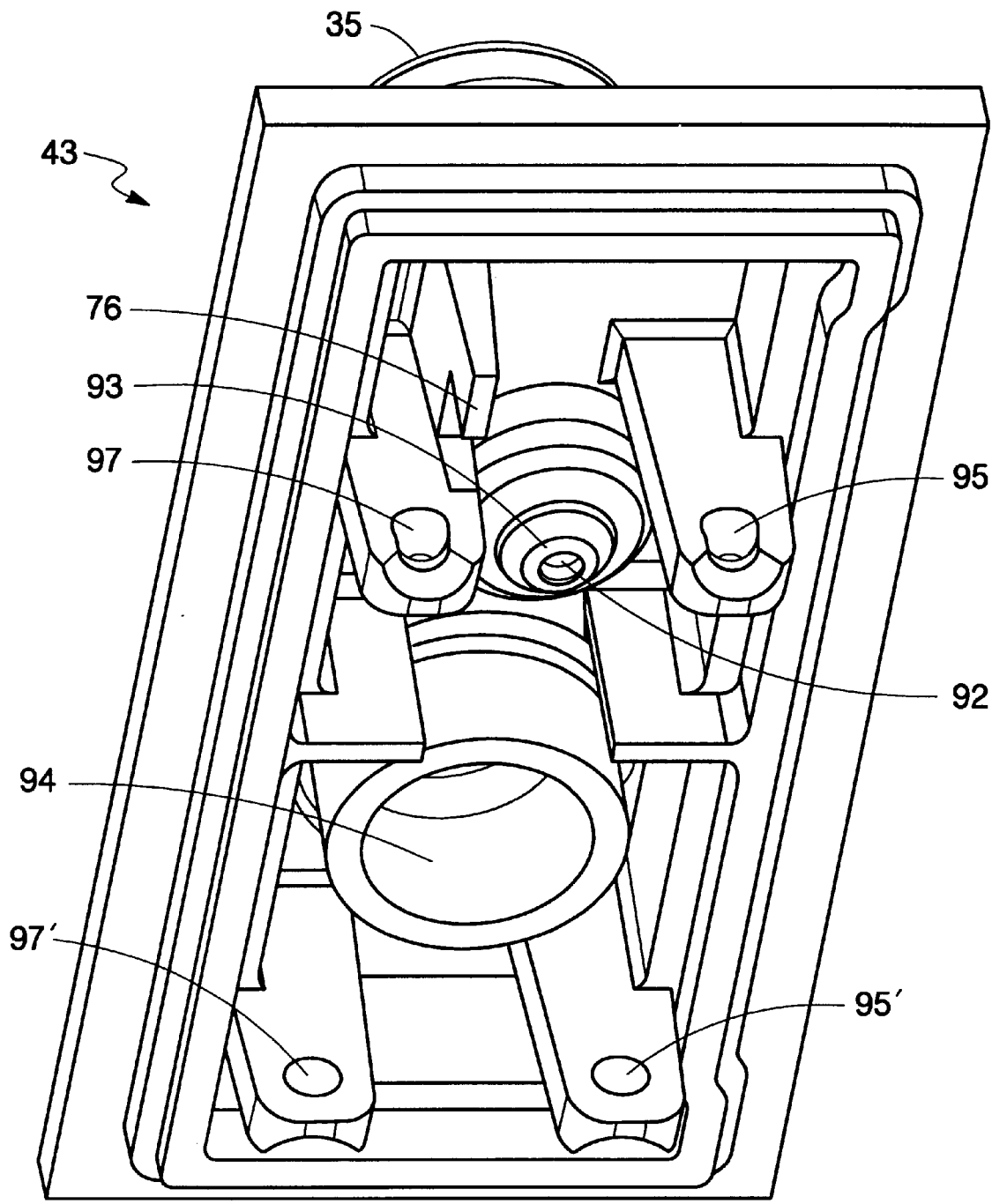
FIG. 15 is a perspective view of the crown for the pen 14 of FIG. 2.
Figure 18:
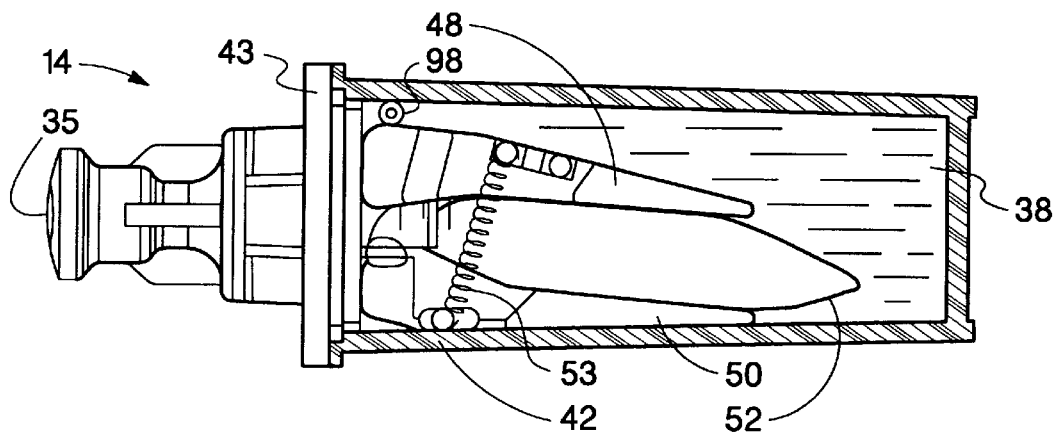

The accumulator lever 50 rotates about the axles 70 until a stop 75 on the lever engages a surface 76 within the crown 43 as illustrated in FIG. 15. The stop prevents the accumulator lever 50 from moving too close and interfering with the pressure regulator lever 48 when the back pressure in the ink accumulator drops. The accumulator lever 50 rotates in the other direction until coming into contact with the pen body 42 as illustrated in FIGS. 18 and 19.

Referring to FIG. 3, reference numerals 53, 53' generally indicates a helical extension spring 53, 53' that urges the two levers 48, 50 together. The spring 53, 53' is preloaded and engages the bosses 64, 72 with a coil loop at each distal end. Each loop is a parallel, cross-over, fully closed, centered loop. This spring 53, 53' is designed to have the least amount of variation in its force constant over its full range of travel so that the back pressure can be regulated as closely as possible.

Figure 7:
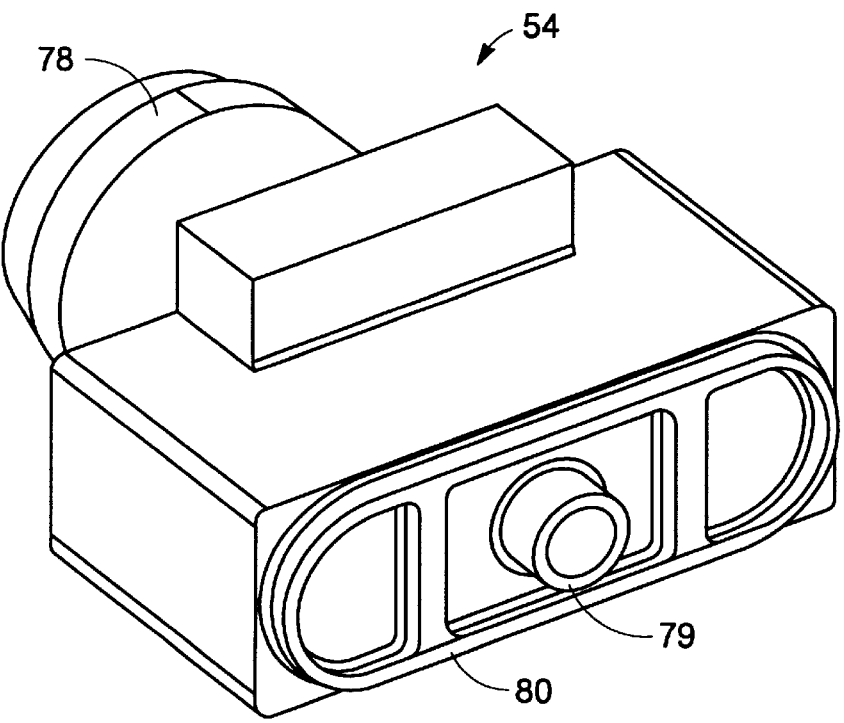
FIG. 7 is a perspective view of a fitment for the pen 14 of FIG. 2.

The fitment 54, illustrated in FIGS. 2 and 7, supports the bag 52 and attaches the bag 52 to the crown 43. The fitment 54 has a lip 78 that engages the crown 43 and forms a hermetic seal with it. The fitment 54 includes a vent 55 that provides communication between the interior of the bag 52 and ambient pressure. At the distal end of the fitment 54 is a raised, circular, inner boss 79 and an oval-shaped, outer boss 80. The bag 52 is staked to both bosses. The circular boss 79 provides the main seal between the bag 52 and the fitment 54. The oval-shaped outer boss 80 provides a secondary, redundant sealing surface as well as provides additional support and positioning for the bag 52.

Figure 8:
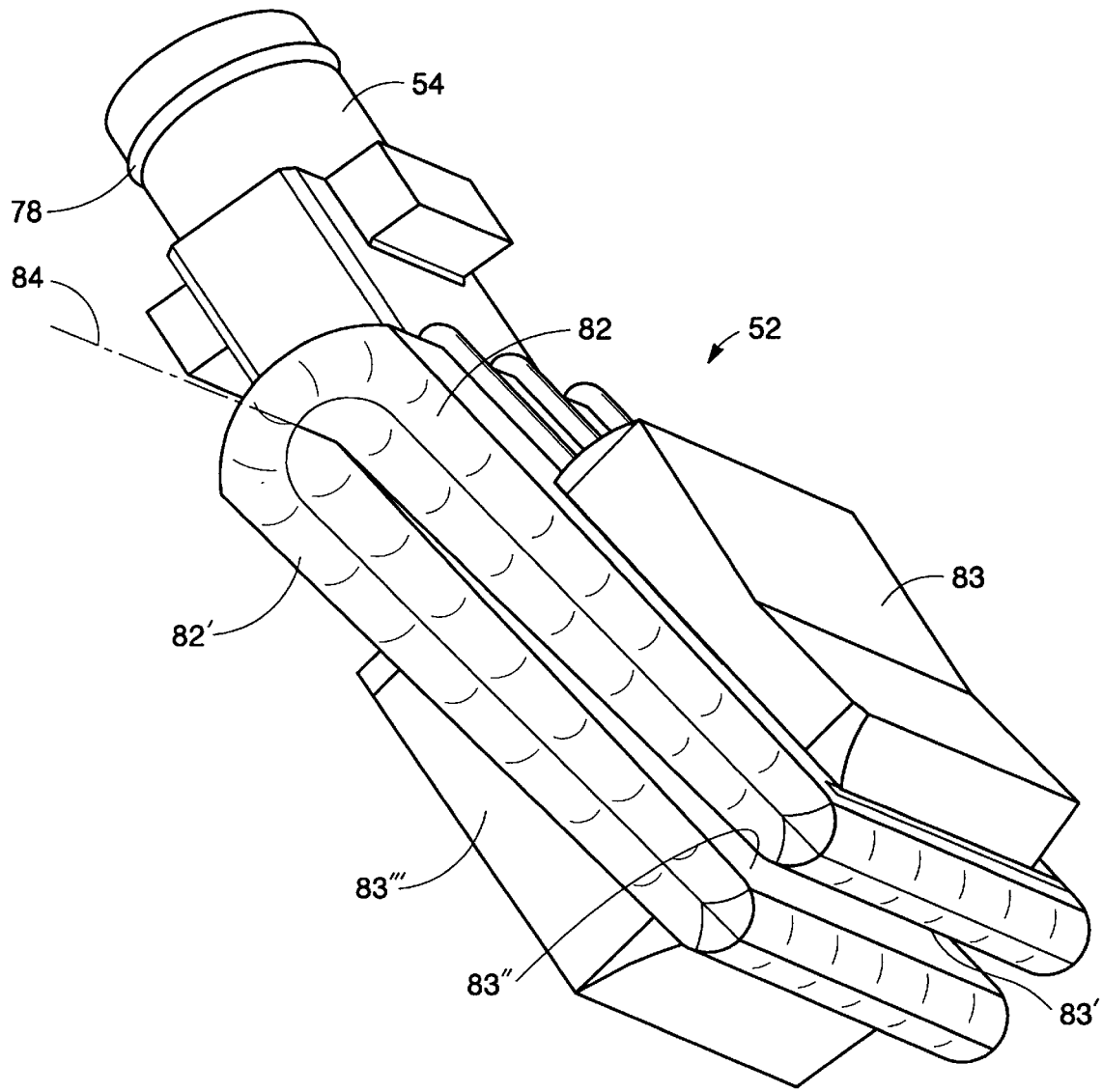
FIG. 8 is a perspective view of the flexible bag for the printing mechanism of FIG. 2 coupled to the fitment of FIG. 7.
Figure 9:
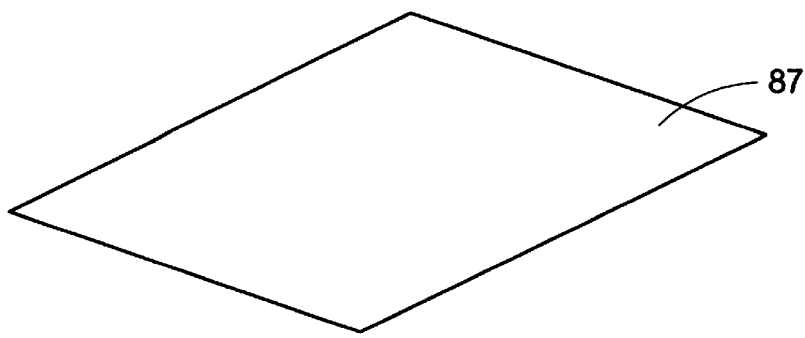
FIGS. 9 through 14 are diagrammatic views of the process for making the flexible bag of FIG. 8.
Figure 10:
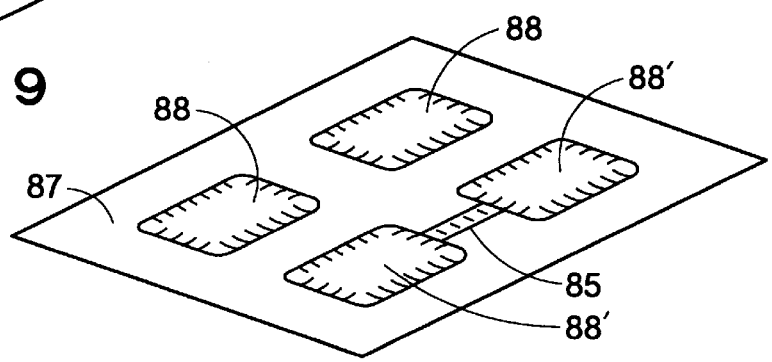
Figure 12:
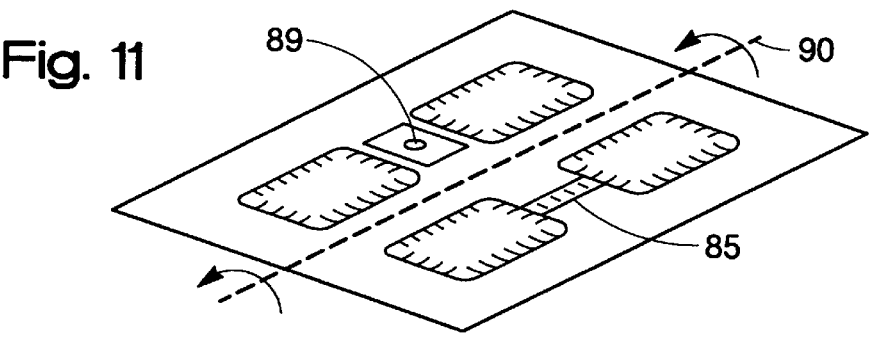

The flexible bag 52, illustrated in FIGS. 2 and 8, expands and contracts as a function of the differential pressure between the back pressure in the ink accumulator 38 and ambient pressure communicated through the vent 55 in the fitment 54. The bag 52 is shown fully inflated in FIG. 8. The bag 52 is designed to push against the two levers 48, 50 with maximum contact area through the entire range of travel of the levers 48, 50. The bag 52 is formed from a single sheet of multi-layer film and includes two lungs 82 that expand and contract about an axis 84. The lungs communicate with each other and are maintained at the same reference pressure. Each lung has two raised areas 83 on either side so that there are four raised areas in all. The two inner raised areas that bear against each other are not shown in FIG. 8 but are indicated by reference numerals 83' and 83". The side opposite the fitment 54 contains a raised communication channel 85, FIGS. 10, 12 between the raised areas which allows a path for air to flow when the bag 52 is completely deflated. The raised areas are thinner than the rest of the bag 52 and provide greater compliance to the travel of the levers 48, 50 and the motion of the lungs about the axis 84. The raised areas are designed tominimize relative motion or sliding of the bag 52 with respect to the levers 48, 50. The combination of the lungs and raised areas provides extra material into which the bag 52 can expand as well as maximizes the change in ink volume displaced by the bag 52 with any change in differential pressure.

The process for making the bag 52 is illustrated in FIGS. 9–14. The film is a multi-layer structure between one and three mils (one mil is 25.4 microns) thick, with 1.5 mils being the preferred thickness. A material that is heat and pressure deformable, and is an excellent barrier to both ink—a somewhat harsh chemical—and air diffusion is contradictory to the need for the material to have a low secant modulus, viz., to be limp. High barrier factor thin films tend to be crystalline and stiff. Materials that have a high value for folding endurance, that can be heat staked and convenient to high speed and automated production line techniques, generally conflict with the need for a material that will withstand the life of the pen, e.g., five years, without changing material properties. Several materials show acceptable performance:

(1) PE/tie/PVDC/tie/PE;
(2) PE/tie/PVDF/tie/PE;
(3) PE/tie/EVOH/tie/PE;
(4) LDPE/tie/EVOH/tie/LDPE (both laminated or co-extruded);
(5) MDPE/tie/EVOH/tie/MDPE (both laminated or co-extruded);
(6) HDPE/tie/EVOH/tie/HDPE (both laminated or co-extruded);
(7) LDPE/tie/PVDC/tie/LDPE (both laminated or co-extruded);
(8) MDPE/tie/PVDC/tie/MDPE (both laminated or co-extruded);
(9) HDPE/tie/PVDC/tie/HDPE (both laminated or co-extruded);
(10) LDPE/tie/PVDF/tie/LDPE (laminated);
(11) MDPE/tie/PVDF/tie/MDPE (laminated);
(12) HDPE/tie/PVDF/tie/HDPE (laminated);
(13) LDPE/tie/ALUMINUM/tie/LDPE;
(14) MDPE/tie/ALUMINUM/tie/MDPE;
(15) HDPE/tie/ALUMINUM/tie/HDPE;
(16) LDPE/tie/ALUMINUM OXIDE/tie/LDPE;
(17) MDPE/tie/ALUMINUM OXIDE/tie/MDPE;
(18) HDPE/tie/ALUMINUM OXIDE/tie/HDPE;
(19) LDPE/tie/SILICON DIOXIDE/tie/LDPE;
(20) MDPE/tie/SILICON DIOXIDE/tie/MDPE;
(21) HDPE/tie/SILICON DIOXIDE/tie/HDPE;
(22) PE/tie/LCP/tie/PE;
(23) ECTFE;
(24) PCTFE;
(25) LCP thin films; and
(26) CVD diamond-like coated films;
where,
PE is polyethylene;
PVDC is polyvinylidene chloride; a DOW$^{tm}$ commercial version is known as SARAN$^{tm}$;
PVDF is polyvinylidenefluoride; and a commercial version is sold under as KYNAR$^{tm}$;
EVOH is ethylene-vinyl alcohol copolymer;
L/M/HDPE is low/medium/high density polyethylene;
ECTFE is a ethylene chlorotrifluoroethylene copolymer;
PCTFE is polychlorotrifluoroethylene;
LCPs are liquid crystal polymers;
CVD is a chemical vapor deposition process; and,
"tie" is a layer used to bond the dissimilar materials together, such as ethylene vinyl acetate ("EVA").

The preferred embodiment is a 1.5 mil overall thick: LDPE/EVA/PVDC/EVA/LDPE (both laminated and coextruded), where the particular PVDC is a DOW$^{tm}$ commercial material known as Saranex$^{tm}$, such as Saranex 11.

Figure 11:
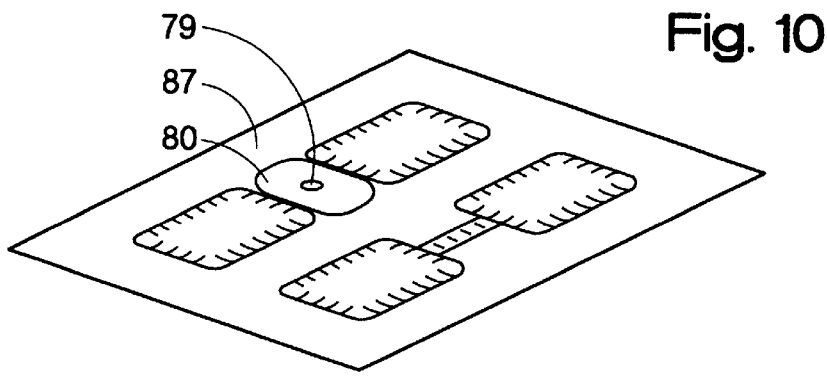
Figure 13:
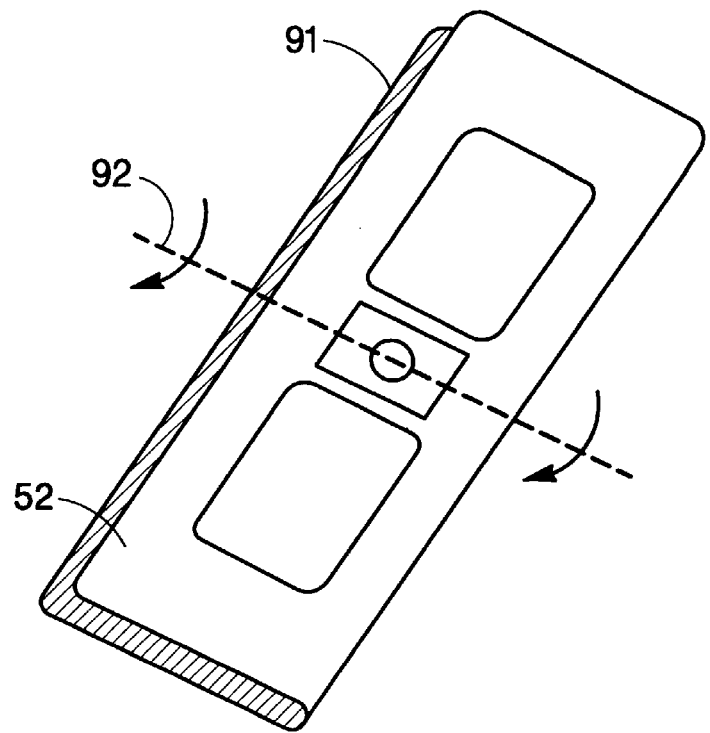
Figure 14:
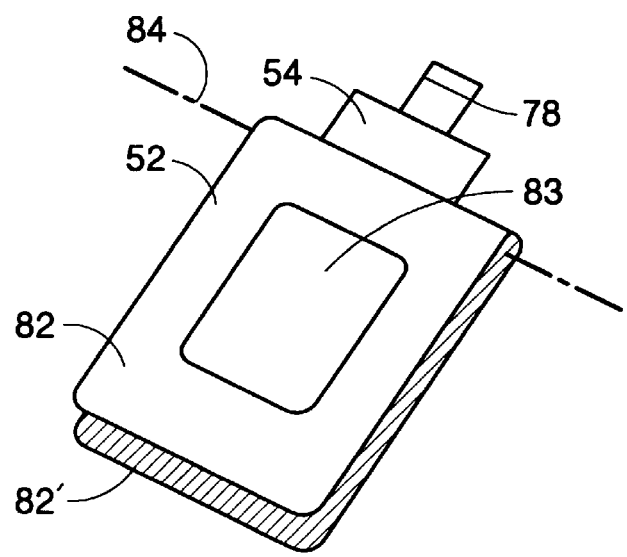

An example of manufacturing an exemplary bag such as shown in FIGS. 2 and 8 is depicted in FIGS. 9–14. To manufacture a bag 52, first, a sheet 87 of flat film is cut to size. Next, the sheet is placed over a die plate, and heat and vacuum are applied to form the four raised areas 88, 88', FIG. 10. Note that the two of the four raised areas or pockets 88' are in communication. Thereafter, the sheet 87 is heat staked to the two bosses 79, 80 on the fitment 54, FIG. 7 as shown in FIG. 11. Next, a hole 89 is made in the film in the center of the circular boss 79 to establish communication to the vent 55 in the fitment 54. The sheet is then folded along axis 90 and the perimeter of the bag 52 where the margins come together is staked. This staking occurs along the three open seams and is indicated by reference numeral 91 in FIG. 13. The perimeter of the bag 52 is then trimmed. Thereafter, the bag 52 is folded along the longitudinal axis 92 of the fitment 54 as illustrated in FIG. 13. This forms the two lungs 82, 82' in the bag 52. Referring to FIGS. 13, 14 and 8, the longitudinal axis 92 of the fitment 54 and the line of folding in FIG. 13 is parallel to the axis 84 of rotation of the two lungs during inflation and deflation of the bag 52.

FIG. 15 illustrates the bottom side of the crown 43 which includes a valve face 93 and the orifice 92 through which ink 29 enters the accumulator 38. The valve face mates with the valve seat 61, FIG. 4 on the pressure regulator lever 48. This mating is also shown in FIG. 16. Ink 29 flows through the fluid downstream interconnect 33, FIG. 1, the septum 35, and the orifice 92. At orifice 92 the back pressure within the accumulator 38 is controlled by the pressure regulator lever 48. Next to the valve face 93 on the crown 43 is a circular boss 94 that receives the lip 78 on the fitment 54, FIG. 8. The boss 94 and the lip form a hermetic seal. The axles 58, 58' FIG. 5 on the pressure regulator lever 48 are snapped into the journals 95, 95' as permitted by the cantilevered construction described above. In like manner the axles 70, 70' on the accumulator lever 50 are received in the journals 97, 97', FIG. 15. Also located on the bottom side of the crown is the surface 76 that engages the stop 75, FIG. 6 on the accumulator lever 50. The stop 75 and the surface 76 prevent the accumulator lever 50 from interfering with the pressure regulator lever 48.

Figure 17:
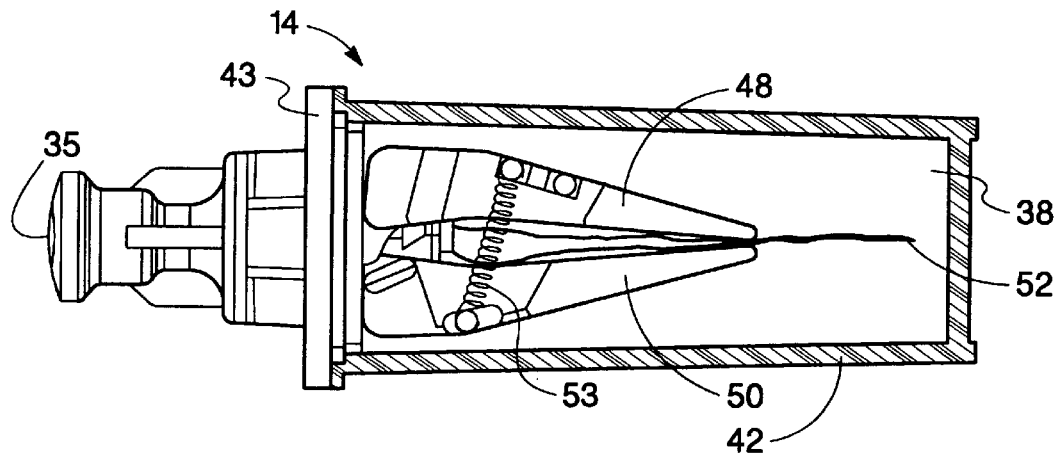
FIGS. 17 through 19 are side elevation views, partially in section, illustrating the operation of the pen 14 of FIG. 2.

The operation of the pen 14 is illustrated in FIGS. 17, 18 and 19. In the initial condition of the pen 14 there is no ink within the ink accumulator 38, and the bag 52 is limp. The back pressure in the accumulator equals ambient pressure. The spring 53, 53' 53 urges the two levers 48, 50 fully together.

Next the needle 34, FIG. 1 is inserted into the septum 35 and a vacuum is drawn on the nozzles in the print head 40 to draw ink 29 into the pen 14. In response to this vacuum the accumulator lever 50 moves first, and the bag 52 begins to expand as shown in FIG. 18. The accumulator lever 50 continues to rotate about its axis of rotation until it engages the side wall of the pen body 42 as shown in FIG. 18. At this point the pressure regulator lever 48 begins to move, and ink 29 begins to enter the accumulator 38 through orifice 92, FIG. 15.

The regulator pressure regulator lever 48 can rotate about its axis of rotation until it engages the side wall of the pen body 42 as shown in FIG. 19, although it is likely that back pressure feedback will prevent this. This is the "full-open" position of the valve. The regulator lever 48 moves between the states illustrated in FIGS. 18 and 19, its position depending on the speed of printing and how fast ink is depleted from the accumulator 38 by the print head 40.

Once the accumulator 38 is filled with ink or printing has stopped, the pressure regulator lever 48 will slowly rotate and close the orifice at the urging of the spring 53, 53' 53. The levers 48, 50 return to the state illustrated in FIG. 18 which is the normal or steady state condition of the pen 14. This state occurs just prior to or subsequent to printing.

Referring to FIG. 18, reference numeral 98 indicates an air bubble that has entered the ink accumulator 38. If the pen 14 is subjected to an elevation in temperature or increased altitude, the air bubble will expand in the accumulator. The expansion of the air bubble will be compensated for by the contraction of the bag 52 due to a pressure change caused by a volume change of the bubble which in turn causes the accumulator lever 50 to move from the state illustrated in FIG. 18 toward that illustrated in FIG. 17. In addition, there will be some accompanying motion of the regulator pressure regulator lever 48 because of the resilience of the valve seat 61. On the other hand, if the air bubble contracts, the bag 52 will expand in response and the pressure regulator lever 48 will open the orifice and admit ink 29 onto the accumulator. In other words, any expansion or contraction of an air bubble will cause the bag 52 to compensate in reverse, that is by contracting to expansion and expanding to contraction. Each of the levers tracks the motion of the bag 52 and, upon pressurization, the accumulator lever 50 rotates before the regulator pressure regulator lever 48 because of the difference in lever arm distances.

When the ink reservoir 28, FIG. 1 is depleted of ink, the levers 48, 50 rotate to the "full-open" position in FIG. 19 and the print head 40 stops ejecting ink.

Alternative embodiments to the relative shape and dimensions of a bag 52 are shown in FIGS. 20–24. It is desirable to achieve implementations which maximizes the bag-to-lever contact area and the moment arm. The contact area shape is therefore tailored to the dimensions of the associated levers. Looking to FIG. 20, it can be seen that surface region 201 presents a broad, substantially flat face which can abut one of the levers 48, 50. As the bag 52 inflates and deflates the lever inner surfaces will slide against region 201. It is preferred that the area of contact between the bag surface region 201 be at a maximum throughout the range of pivotal motion of the levers 48, 50.

Pleats 220 such as shown in FIG. 21, or other like bag material gatherings or flutings, for example such as region 221 in FIG. 22, or otherwise provided excess material of the inflating bag 52 is allowed to unfold outwardly such that as the levers 48, 50 pivot about respective axes and the levers slide along the outer bag walls 223, 225, the contact area between the bag and levers is maintained substantially constant through out the entire range of motion. FIG. 23 depicts a single lung implementation having drawn or formed side walls 223, 225. FIG. 24 depicts a molded frame implementation having an extended fitment member 227, having one thin film side wall 225. Other design embodiments can be constructed in accordance with a specific implementation to fit a particular pen.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application to thereby enable others skilled in the art to understand the invention for various embodiments and with various modifications as are suited to the particular use contemplated. It is intended that the scope of the invention be defined by the claims appended hereto and their equivalents.

What is claimed is:

1. A pressure regulator device for an ink-jet pen, comprising:

an inlet valve means for controlling flow of ink into the pen, said inlet valve means is coupled releasably to an ink supply; and, coupled to said inlet valve means, first lever means for maintaining a predetermined back pressure within said ink-jet pen, second lever means for opening and closing said valve means, bias means for biasing said first lever means with a predetermined bias force such that said predetermined back pressure is established within said ink-jet pen and such that said first lever means and said second lever means are mounted with said predetermined bias force toward each other, and a flexible inflation-deflation means, vented to ambient atmospheric pressure, for balancing ambient atmospheric pressure against said bias means, said inflation-deflation means is mounted between said first lever means and said second lever means such that predetermined areas of said inflation-deflation means contact each said first lever means and said second lever means respectively and have shapes and dimensions such that said predetermined areas constitute maximized contact areas.

2. The device as set forth in claim 1, said inflation-deflation means further comprising:

a thin-film fabricated from the materials selected from the group consisting of (1) PE/tie/PVDC/tie/PE;
   (2) PE/tie/PVDF/tie/PE;
   (3) PE/tie/EVOH/tie/PE;
   (4) LDPE/tie/EVOH/tie/LDPE (both laminated or co-extruded);
   (5) MDPE/tie/EVOH/tie/MDPE (both laminated or co-extruded);
   (6) HDPE/tie/EVOH/tie/HDPE (both laminated or co-extruded);
   (7) LDPE/tie/PVDC/tie/LDPE (both laminated or co-extruded);
   (8) MDPE/tie/PVDC/tie/MDPE (both laminated or co-extruded);
   (9) HDPE/tie/PVDC/tie/HDPE (both laminated or co-extruded);
   (10) LDPE/tie/PVDF/tie/LDPE (laminated);
   (11) MDPE/tie/PVDF/tie/MDPE (laminated);
   (12) HDPE/tie/PVDF/tie/HDPE (laminated);
   (13) LDPE/tie/ALUMINUM/tie/LDPE;
   (14) MDPE/tie/ALUMINUM/tie/MDPE;
   (15) HDPE/tie/ALUMINUM/tie/HDPE;
   (16) LDPE/tie/ALUMINUM OXIDE/tie/LDPEL
   (17) MDPE/tie/ALUMINUM OXIDE/tie/MDPE;
   (18) HDPE/tie/ALUMINUM OXIDE/tie/HDPE;
   (19) LDPE/tie/SILICON DIOXIDE/tie/LDPE;
   (20) MDPE/tie/SILICON DIOXIDE/tie/MDPE;
   (21) HDPE/tie/SILICON DIOXIDE/tie/HDPE;
   (22) PE/tie/LCP/tie/PE;
   (23) ECTFE;
   (24) PCTFE;
   (25) LCP thin films; and
   (26) CVD diamond-like coated films.

3. The device as set forth in claim 1, wherein said inflation-deflation means further comprises:

a thin film construct of a composition of LDPE/EVA/PVDC/EVA/LDPE, where PVDC is polyvinylidene chloride.

4. The device as set forth in claim 3, wherein said thin film construct further comprises:

a laminated film.

5. The device as set forth in claim 3, wherein said thin film construct further comprises:
   a co-extruded film.

6. The device as set forth in claim 3, wherein said thin film construct further comprises:
   said thin film having a thickness in a range of approximately one to three mils.

7. The device as set forth in claim 1, said valve means further comprising:
   a valve seat fabricated of a complaint material selected from the group consisting of
   (1) fluorosilicone elastomers,
   (2) silicon rubbers,
   (3) blends of fluorosilicone and silicon,
   (4) fluoroelastomers, consisting of either a combination of copolymers based on vinylidene fluoride and hexafluoropropylene or a combination of tripolymers based on vinylidene fluoride, hexafluoropropylene, and tetraflurorethylene, and
   (5) EDPM (ethylene propylene dimer- or diene-monamers).

8. An ink-jet pen device for an ink-jet pen adapted to be coupled to an off-axis supply of ink, said device comprising:
   an ink accumulation chamber;
   means for fluidically coupling said supply of ink to said chamber such that ink is transferred from said supply of ink to said chamber at a first predetermined pressure greater than or equal to ambient atmospheric pressure;
   a print head fluidically coupled to said chamber;
   mounted within said chamber, first means for regulating ink flow into said chamber and for maintaining a predetermined gauge pressure at said print head such that said gauge pressure is less than said first predetermined pressure, said first means having a positive force bias mechanism; and
   coupled to said first means via said positive force bias mechanism, second means for compensating for trapped gases within said chamber and for maintaining a predetermined gauge pressure at said print head such that said gauge pressure is less than said first predetermined pressure, said second means including an inflation-deflation means having a vent to ambient atmospheric pressure and being mounted within said chamber such that said inflation-deflation means provides a counter-bias force against said positive force bias mechanism, wherein predetermined areas of said inflation-deflation means abuts said second means and said inflation-deflation means has a shapes and dimensions such that said predetermined areas constitute maximized contact areas.

9. The device as set forth in claim 8, wherein said means for fluidically coupling said supply of ink to said chamber further comprises:
   a valve actuated by said first means, having a resilient material valve seat mechanism coupled to said first means.

10. The device as set forth in claim 8, wherein said second means further comprises:
    said inflation-deflation means having regions of contact with said first means such that said regions are maximized throughout a relative range of motion between said first means and said inflation-deflation means.

11. The device as set forth in claim 8, wherein said inflation-deflation means further comprises:
    a thin film construct of the composition LDPE/EVA/PVDC/EVA/LDPE.

12. An ink-jet printing apparatus, comprising:
    a remote ink reservoir containing ink under a pressure of P1;
    an ink-jet print head;
    an ink accumulation chamber in fluid communication with the print head;
    a conduit for ink connecting the remote reservoir and the accumulation chamber;
    a valving mechanism in fluid communication with the ink accumulation chamber for selectively connecting said conduit;
    a predetermined area within the printing apparatus to collect air;
    an expandable/contractible bag mechanism within the ink accumulation chamber having a predetermined internal reference pressure, said bag mechanism having an exterior region in fluid communication with the predetermined air collection area and compensating for air within the print cartridge;
    an actuating mechanism for supplying ink to the print head at a substantially constant back pressure of P2, where P1 is substantially greater than P2, said actuating mechanism having a pivot axis and a predetermined pivot range; and
    said bag mechanism directly bearing against said actuating mechanism wherein contact areas of said actuating mechanism and said bag mechanism have shapes and dimensions to maximize contact area throughout the pivot range of said actuating mechanism.

13. The apparatus as set forth in claim 12, said valving mechanism further comprising:
    a resilient material valve seat wherein compliance in accordance with P2 compensates for air within the print cartridge.

14. A system for delivering ink to a inkjet pen, having a print head operating at a gauged predetermined print head back pressure, the system comprising:
    a supply of ink in a positive pressure container wherein said positive pressure is greater than or equal to ambient atmospheric pressure;
    a pen cartridge including an ink accumulation chamber;
    mounted within said chamber, first means for simultaneously controlling flow of ink from said container into said pen, regulating said back pressure, and compensating for gas bubbles, said first means including a positive bias member acting to retain said first means in a first predetermined position when said chamber is empty; and
    coupled to said first means, second means for compensating for trapped gases within said pen and regulating said back pressure, including a compliant means for balancing ambient atmospheric pressure against said positive bias and said back pressure, said compliant means being coupled to said first means such that contact between said first means and said second means is substantially constant.

* * * * *

UNITED STATES PATENT AND TRADEMARK OFFICE
CERTIFICATE OF CORRECTION

PATENT : 5,975,686

DATED : Nov. 2, 1999

INVENTOR(S) : Mark Hauck, et al.

It is certified that error appears in the above-identified patent and that said Letters Patent is hereby corrected as shown below:

On the title page, [75], after "Norman E. Pawlowski, Jr.," add --John Greeven--.

Signed and Sealed this

Fifteenth Day of February, 2000

*Attest:*

Q. TODD DICKINSON

*Attesting Officer*      *Commissioner of Patents and Trademarks*